United States Patent [19]
Pletl et al.

[11] Patent Number: 5,920,731
[45] Date of Patent: Jul. 6, 1999

[54] SINGLE-HOUSING ELECTRICAL DEVICE SELF-CONFIGURABLE TO CONNECT TO PCMCIA COMPLIANT OR NON-PCMCIA COMPLIANT HOST INTERFACES

[75] Inventors: Josef Pletl, Heinrich-Wieland; Andreas Junghans, Hallberg, both of Germany

[73] Assignee: VLSI Technology, Inc., San Jose, Calif.

[21] Appl. No.: 08/804,222

[22] Filed: Feb. 21, 1997

[51] Int. Cl.$^6$ .................................................. G06F 13/10
[52] U.S. Cl. ........................................ 395/834; 395/828
[58] Field of Search ....................... 307/131; 340/825.06; 365/226; 380/3; 395/284, 285, 651, 828, 500; 323/281; 364/707

[56] References Cited

U.S. PATENT DOCUMENTS

| | | | |
|---|---|---|---|
| 4,972,470 | 11/1990 | Farago | 380/3 |
| 5,119,498 | 6/1992 | McNeill et al. | 395/284 |
| 5,371,892 | 12/1994 | Peterson et al. | 395/651 |
| 5,430,617 | 7/1995 | Hsu | 361/818 |
| 5,451,933 | 9/1995 | Stricklin et al. | 340/825.06 |
| 5,514,951 | 5/1996 | Halim et al. | 323/281 |
| 5,572,409 | 11/1996 | Nathan et al. | 361/806 |
| 5,589,719 | 12/1996 | Fiset | 307/131 |
| 5,598,318 | 1/1997 | Dewitt et al. | 361/683 |
| 5,706,239 | 1/1998 | Brys | 365/226 |
| 5,793,989 | 8/1998 | Moss et al. | 395/285 |
| 5,805,473 | 9/1998 | Hadderman | 364/707 |
| 5,819,107 | 10/1998 | Lichtman et al. | 395/828 |

*Primary Examiner*—Thomas C. Lee
*Assistant Examiner*—Chien Yuan
*Attorney, Agent, or Firm*—Wagner, Murabito & Hao

[57] ABSTRACT

An apparatus and method which overcomes connectivity limitations on PCMCIA and PC-CARD95 compatible devices by reconfiguring standard PCMCIA and PC-CARD pins for additional electrical interfaces. A detection circuit in the PC-card can detect the different interfaces. Once the different interfaces are identified, the connections to the receptacles of the PC-card connector are reconfigured such that the functional assignments of the receptacles conform with the requirements of each different interface. Thus, connection between different electrical interfaces to the physical interface of a PCMCIA-compatible device, without interference between them is possible.

19 Claims, 10 Drawing Sheets

SINGLE-HOUSING ELECTRICAL DEVICE SELF-CONFIGURABLE TO CONNECT TO PCMCIA COMPLIANT OR NON-PCMCIA COMPLIANT HOST INTERFACES

TECHNICAL FIELD

The present invention relates to the field of computer PCMCIA standard interfaces. More specifically, the present invention relates to an improved method and device for connecting a PCMCIA interface to both conforming and non-conforming devices.

BACKGROUND ART

PC-Cards are connectable to computers to add functionality to the host computer. PC-cards typically contain phone modems, infrared communication devices, memory storage and devices that perform coprocessing functions. PC-cards are coupled to a host electronic device such as a computer to add the desired functionality. In addition, PC cards allow for other peripheral devices to be connected to the host computer. An advantage of the use of PC cards over other connectivity mechanisms is the ease with which PC cards may be inserted and removed, making it easy to change from one device to another. In addition, since PC cards typically contain their own microprocessors and memory storage registers, they can perform most if not all of the required processing functions internally. Therefore, by using a PC-card to add functionality to a host computer, the user does not need to load large amounts of programming into the host computer or use large amounts of data storage, saving host computer resources for other applications.

PC cards typically adhere to one or more standard. The most prevalent standard for PC-CARDS is the standard set by the Personal Computer Memory Card Association (PCMCIA) headquartered in San Jose, Calif. PCMCIA is an international standards body and trade association with over 500 member companies that was founded in 1989 to establish standards for Integrated Circuit cards and to promote interchangeability among mobile computers where ruggedness, low power consumption, and small size were critical. Today, PCMCIA promotes the interoperability of PC Cards not only in mobile computers, but in such diverse products as digital cameras, cable TV, set-top boxes, and automobiles.

Most prior art PC cards adhere to the PCMCIA 2.x standard. More recent PC cards adhere to the PC-CARD95 standard which is the successor of the PCMCIA 2.x standard. Since the PC-CARD95 standard is backward compatible to the PCMCIA 2.x, PC cards which conform to the PC-CARD95 standard use an interface connector which also conforms to the PCMCIA 2.x standard. Since the upcoming PC-CARD97 standard will be backward compatible with the PC-CARD95, as is anticipated with all future releases of PC-CARDxx standards, cards which conform to future anticipated standards may use an interface connector that conforms to current standards. A device which follows the electrical, physical and logical PC-CARD standard guidelines will be referred to in this application as "PCMCIA" or "PCMCIA-compliant".

However, for complex applications it is desired to provide a device which can connect and operate through different interfaces. To connect to a non PCMCIA-compliant interface, a different PC-card is typically used which has the required non-PCMCIA-compliant interface. In order to connect to any different non-PCMCIA-compliant interface, a different PC card which includes the different non-PCMCIA-compliant interface is required. Thus, in order to provide a function through multiple interfaces, several PC-cards are required which may include the same or similar internal processing devices and algorithms, but which interface differently with different interfaces. For example, to incorporate connection to a PCMCIA-compliant interface, and two different non-PCMCIA-compliant interfaces, three PC-cards would be required, each having a different interface. In addition, each PC-card has less versatility than desired because of the lack of connectivity to other interfaces.

One possible solution to this problem is the use of additional connectors on each PC-card. However, due to the form factor constraints imposed on PC cards, and in particular PC-cards adhering to the PCMCIA standard, the incorporation of additional connectors into the PC-card itself is not feasible. This is primarily due to the fact that multiple connector designs are difficult, if not impossible, to integrate into the small housings of the PC-card. Thus, multiple connectors are seldom incorporated into the PC-card housing.

Another possible solution is the use of multiple connectors which are coupled by cable to the PC-card. However, the resulting device is bulky, expensive to manufacture and difficult to operate. Because of the multiple cables and connectors, the device is confusing and difficult to operate. In addition, the device is not as reliable and as easy to maintain as devices which do not contain multiple cables and connectors.

Though additional connectors could be added to the device to allow for connectivity to multiple interfaces, it would be difficult to determine which interface is to be active at any particular time. This is particularly critical in the situation when multiple functionality is combined with the multiple interface problem. For example, when the function to be performed by the device is dependent on the interface to which it is attached, it is difficult to determine which function to activate within the device. One possible solution would be to incorporate hand operated switches. However, due to form factor constraints, hand operated switches are impractical and difficult if not impossible to integrate into the device without violating the PCMCIA and PC CARD 95 standards. In addition switches are expensive and they present reliability and maintainability problems. Also, switches make the operation of the device more complex and hence more difficult for the user.

The complexity of electronic devices such as PC-cards has been steadily increasing. Therefore, more features and functions are required to be incorporated into each device. However, the incorporation of increased functionality into PC-cards is often infeasible due to the restrictions imposed by the PCMCIA standard. Due to the problems associated with the incorporation and use of switches on PC-cards, switches typically are not placed on PC-cards.

Typically, multiple functions are obtained by using multiple PC-cards. For example, a first PC card which provides a first function is inserted into the host computer to access a specific set of functions. When a second set of functions is needed, the first PC card is removed and a second PC card is placed into the PC card receptacle on the host computer. Thus, even if the connectivity problems could be overcome, the PC-card has no way to distinguish between connections that may dictate different sets of functions. For example, it may be desirable to perform different functions when the PC-card is inserted into a charger and/or an adapter than would be performed when the PC-card is installed into a PCMCIA compliant interface. In addition, it may be desirable to perform a entirely different set of functions when the PC-card is not inserted into any host. Prior art systems typically have no way to distinguish between these different interfaces and no way to distinguish the lack of connectivity to an interface.

What is needed is a way to overcome the connectivity limitations of PCMCIA and PC-CARD 95 compatible devices. More specifically, what is needed is a PC Card which has an interface compliant with PCMCIA standards which will also allow for connectivity of different electrical interfaces. In addition, what is needed is a method of using a PCMCIA standard interface which will allow multiple different electrical interfaces to work over a single PC card connector alternately. In addition, there is a need to detect the type of interface that is being used so that different sets of functions may be performed by the device which are dependent on the interface being used. The present invention provides a single elegant solution which satisfies all of these needs.

DISCLOSURE OF THE INVENTION

The present invention meets the above needs with a device and a method which allows a single device conforming to PCMCIA standards to be interfaced with both PCMCIA compliant interfaces and non-compliant interfaces. The present invention can detect different interfaces and the lack of connectivity to any interface and can perform different sets of functions when connected to the different interfaces.

A PC-card which includes a connector that complies with PCMCIA standards is disclosed. The PC-card meets PCMCIA 2.x, and PC-CARD95 standards. The PC-card includes circuitry for determining whether or not the PC-card is connected to an interface; and when it is connected to an interface, it can distinguish between different interfaces.

A single PC-card which connects to multiple interfaces is disclosed. The PC-card includes electronic circuits including a detection circuit which allows the PC card to detect the interface to which the PC-card is connected and which also detects when the interface is not connected to any host. Once the PC-card detects the interface to which it is connected, it reassigns connections to comply with the connectivity requirements of each interface and performs various functions which are required by the particular host. Although the present invention could be used in conjunction with any of a number of different devices, for the purpose of clarity, it is described with reference to a PC-card which is a wireless modem.

The PC-card may be connected to a host (e.g. notebook computer) having a PCMCIA-compliant interface. The detection circuits of the PC-card analyze the characteristics of the host as detected by one of the connector receptacles on the PC-card. The pin on the host to be tested is designated as the "detect pin" Any of a number of different pins and corresponding connector receptacles could be used and connector pins and receptacles having various different functional assignments could be used. Upon the determination by the detection circuits of the PC-card that it is connected to a PCMCIA-compliant host, the functional assignments of each of the connector receptacles complies with the interface requirements of the PCMCIA standard. When connected to a host having a PCMCIA compliant interface, the PC-card performs a first set of functions, operating as a wireless modem through a PCMCIA-compliant interface.

The same PC-card may be connected to a non-PCMCIA compliant host. The detection circuits of the PC-card analyze the characteristics of the host as detected by one of the connector receptacles on the PC-card. Once the detection circuit determines that the host has a non PCMCIA-compliant interface, the functional assignments of the connector receptacles are reassigned (with the exception of the receptacle that serves as the detector) so as to conform with the interface requirements of the non-PCMCIA-compliant interface. The electronic circuits of the PC-card could perform the same set of functions as performed for the host having a PCMCIA-compliant interface, and the functions would simply be routed through different pins and receptacles as dictated by the non-PCMCIA-compliant interface (the pins would have different functional assignments). However, a different set of functions could be performed by the electronic circuits of the PC-card. This different set of functions could be the functions performed through the host having a PCMCIA-compliant interface plus some additional functions. Alternatively some of the functions performed through the host having a PCMCIA-compliant interface could be deleted, or an entirely different set of functions could be performed. Though connection may be to any of a number of different devices and connections which are non-PCMCIA compliant, connection to a charger which includes a RS-232 adapter is disclosed.

The detection circuit of the PC-card may also detect additional hosts having different non-PCMCIA-compliant interface. Thus, when the PC-card is connected to the other hosts, the PC-card can identify the other hosts by analyzing the electrical characteristics of the pin of the host that serves as the detect-pin. In addition to using ground pins, the power supply pins (Vcc) may be used as detection pins. Alternatively, the BVD pins (BVD1 and BVD2) may be used as detection pins. In addition the VS pins (VS1 and VS2) may be used as detection pins. In all of these embodiments, the PC-card distinguishes between a PCMCIA-compliant interface, no connection, and multiple non-PCMCIA-compliant interfaces.

The PC card is also capable of stand alone operation. When the PC-card is not connected to any host, the detection circuit of the PC-card detects that there is not a connection to any host. The PC-card then executes a specific set of functions which are designated as "stand-alone" functions. The stand-alone functions are performed independently by the PC-card and no connection to a host is required. When the PC-card is performing stand-alone functions, the PC-card is powered solely by the internal battery.

Many different functions and applications may be performed by devices that comply with the PCMCIA standard. In addition, there are many different ways to integrate functions, electronic devices and electronic circuits so as to conform with the PCMCIA standard. Many of these different functions, circuits and devices and the functional assignments of the various pins and receptacles covered by the PCMCIA standard are discussed in *The PCMCIA Developers Guide,* 2nd edition, by Sycard Technology, which is incorporated herein by reference.

The present invention allows for multiple different electrical interfaces to work over a single PC card connector alternately. Thus, different PC-cards are not required in order to connect with different interfaces. In addition, PC cards having multiple connectors are not required. Thus, many of the functional and connectivity limitations of prior art devices having PCMCIA-compliant interfaces are overcome by the present invention. In addition, since the present invention may detect many different interfaces and may detect when the device is not connected to an interface, the present invention may perform functions such as stand-alone functions which could not be performed by a single prior art device conforming to the PCMCIA standard. The present invention allows each PC-card to do more functions than prior art devices since the functions of the PC-card are not limited by the connectivity constraints of prior art devices. In addition, the present invention allows each PC-card to perform more complex sets of functions since different sets of functions may be "switched on" for any given interface.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
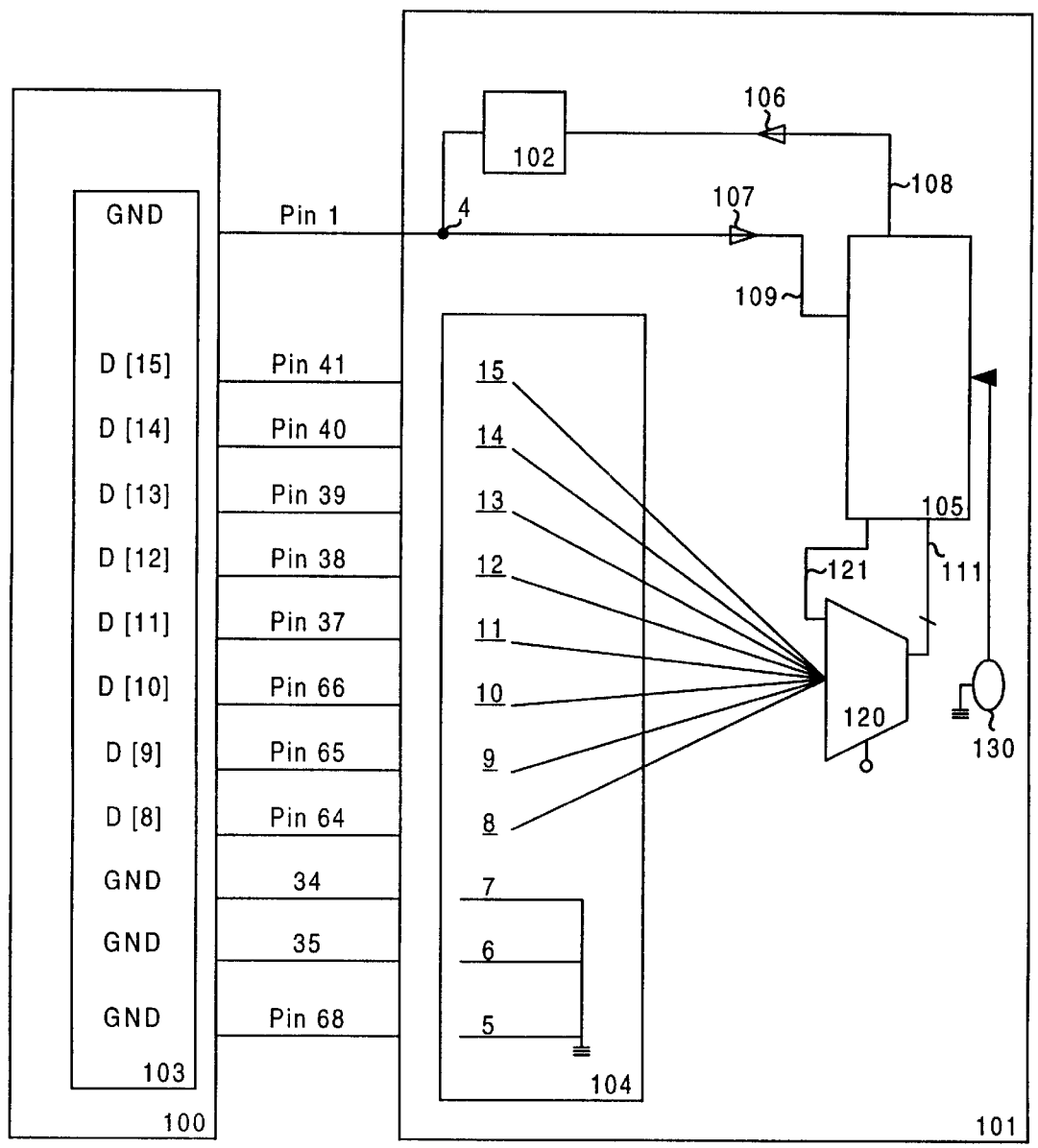
FIG. 1 is a diagram of a PC-card connected to a host having a PCMCIA-compliant interface in accordance with a first embodiment of the present invention.

With reference now to FIG. 1, host computer 100 is shown to include PC-card interface 103 which is a PCMCIA compliant interface. That is, PC-card interface 103 complies with the standards set by the PCMCIA standards body. Receptacles 4–7 are coupled to ground and receptacles 8–15 are coupled to the electronic circuits of host computer 100 so as to allow for the transfer of data between host computer 100 and PC-card 101. PC-card 101 includes interface 104 which is a PCMCIA compliant interface. Interface 104 includes receptacles 4–15 which mate with pins 1, 34, 35, 37–41, and 64–66 of host computer 100. Pin 1 and pins 34, 35, and 68 are coupled to ground pursuant to the PCMCIA standard. In the present invention one of pins 1, 34, 35, and 68 is designated as a "detect pin." In this embodiment pin 1 is designated as the "detect pin". Therefore, the connectivity and function of pins 34, 35 and 68 are not changed.

Continuing with FIG. 1, microcontroller 105 is an integrated circuit device including electronic circuits that perform specific functions and communicate with host computer 100 through multiplexer 120 and receptacles 8–15. Power source 130 provides power to PC-card 101. A detection circuit is coupled to microprocessor 105 as shown by line 108 that includes buffer 106 and resistor 102, that are connected to receptacle 4 and to buffer 107. In the simplest implementation, buffer 106 and buffer 107 are standard logic gates. These standard logic gates may be any of a number of known types of logic devices such as transistor transistor logic (TTL) or complimentary metal oxide semiconductor (CMOS) integrated circuit devices that comply with the PCMCIA standards. Pin 1 is connected to ground through buffer 107 and microcontroller 105 on PC-card 101, as shown by line 109. Thus, pin 1 is connected to ground as is required by the PCMCIA standard. Buffer 106 selectively applies a voltage of 5 volts to the detection circuit which is used to determine the connection status of PC-card 101. Upon the application of voltage by buffer 106, since pin 1 is connected to ground on host computer 100, though the voltage on pull-up resistor 102 is five volts on the PCMCIA card side, the signal level detected by buffer 107 is zero volts.

Figure 2:
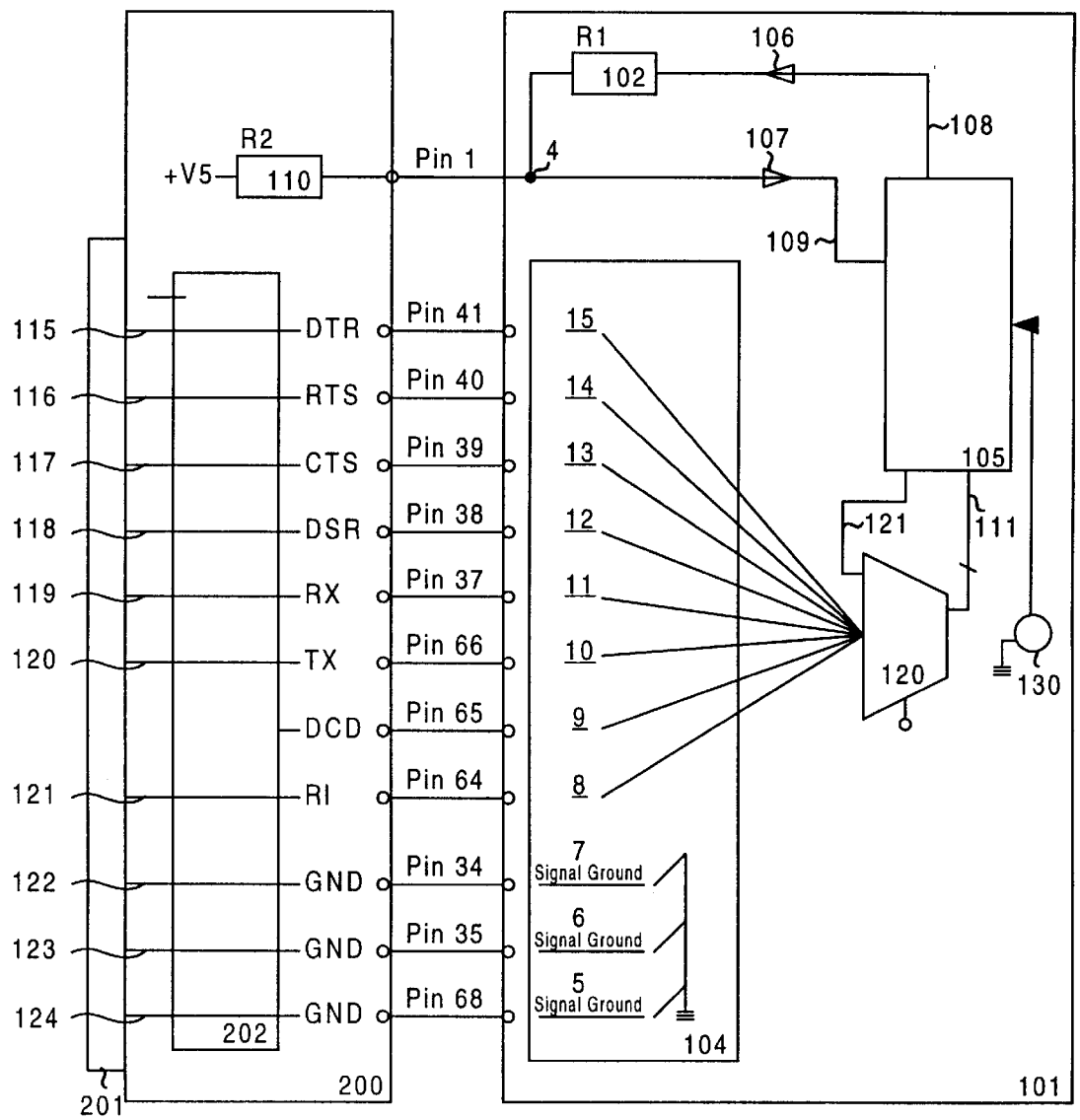
FIG. 2 is a diagram of a PC-card connected to a host having a non-PCMCIA-compliant interface in accordance with a first embodiment of the present invention.

FIG. 2 shows PC-card 101 connected to host 200, which is a non-PCMCIA compliant host. Host 200 is a charger and a RS-232 adapter. Host 200 is shown to include connector 201 which complies with the RS-232 standard. Thus, any electronic device having a RS-232 connection may interface with PC-card 101 by connection to RS-232 connector 201. Host 200 includes voltage level shifter 202. Voltage level shifter 202 converts the TTL-level signals (+5V, 0V) from the PCMCIA-card to the RS-232 voltage level (+/−12V) and vice versa. Host 200 furthermore transfers the converted signal to the corresponding RS-232 connector pins as shown by lines 115–124. Host 200 also functions as a charger by coupling power through pins 34, 35, and 68 which serve a ground connections to battery 130.

Continuing with FIG. 2, upon the application of power to PC-card 101, the detection circuit analyzes the electrical characteristics of the detect-pin, pin 1. Resistor 110 has a value much smaller than internal pull-up resistor 102 of PC-card 101. A value of less than or equal to 1 kOhm is appropriate. Because of resistor 110 in host 200, pin 1 will carry 5 Volts (logical HIGH). Detection is possible, because receptacle 4 is connected to pin 1 which is connected to +5V in host 200, as opposed to connection to ground (pin 1 is connected to ground when connected to PCMCIA-compliant interface such as computer 100 shown in FIG. 1). This allows buffer 107 to detect the connection to a to a non-PCMCIA-compliant interface. Through line 109, microcontroller 105 receives a signal indicating the connection status. Microcontroller 105 then sends an electrical signal or signals to multiplexer 120 so as to change the connections between receptacles 5–15 and microcontroller 105. As a result, the functional assignments of the receptacles 5–15 are changed from PC data and signal ground to the RS-232 normal lines (DTR, RTS, CTS, DSR, RX, TX, DCD, RI) by multiplexer 120 on PC-card 101.

Referring again to FIG. 2, the PC-card could be modified so as to detect additional non-PCMCIA compliant devices by replacing buffer 107 with an analog-to-digital converter. Then, different adapters could be identified by using different values of resistance for resistor 110 in each additional non-PCMCIA compliant device. In addition, detection circuits such as those shown in FIG. 1 and FIG. 2 could be connected to different ground pins to provide for detection of other different non-PCMCIA compliant devices.

Figure 3:
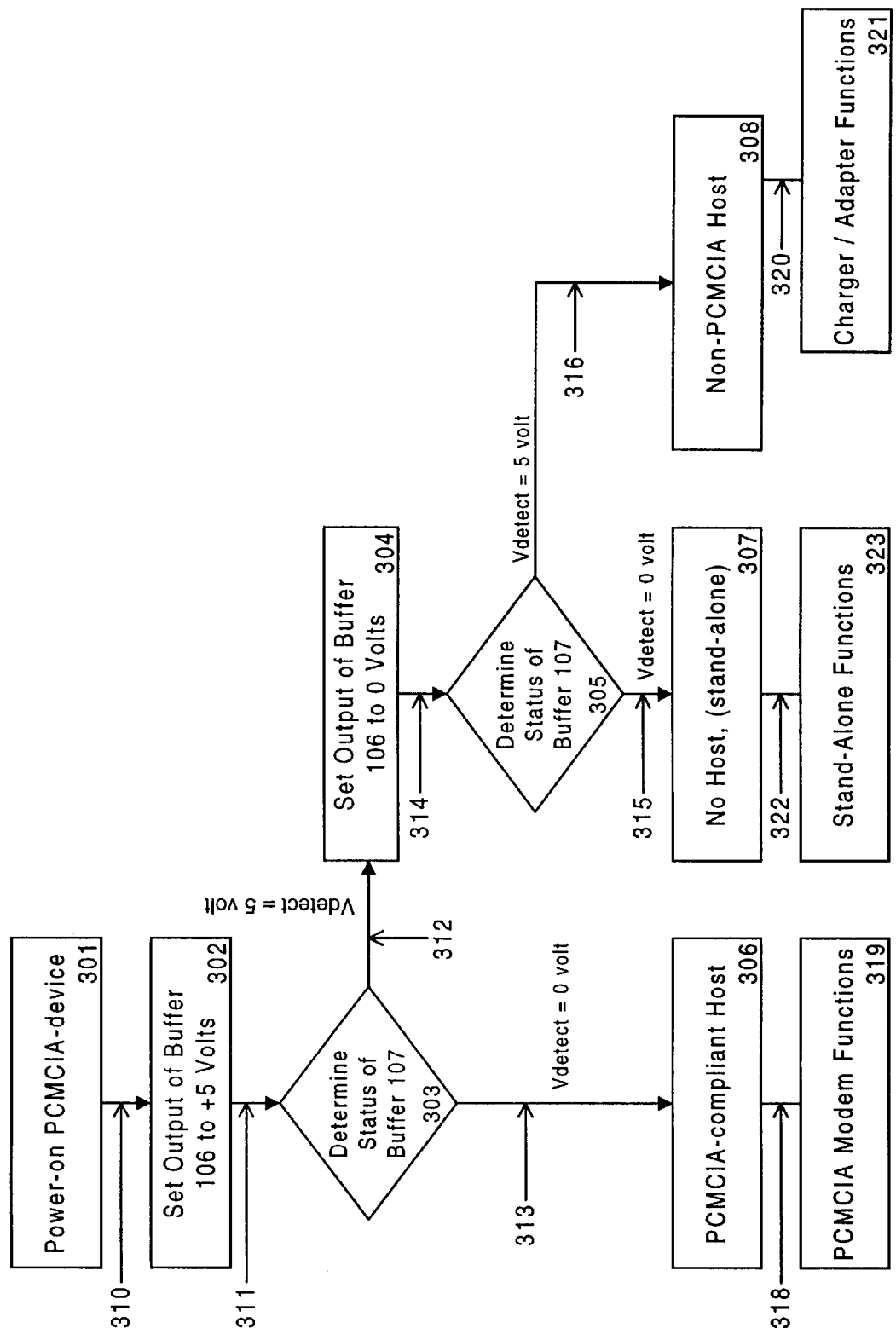
FIG. 3 is a diagram of a decision tree in accordance with a first embodiment of the present invention.

FIG. 3 illustrates a decision tree which shows the method for distinguishing the different operational modes. Once power is applied to the PC-card, as shown by block 301, the PC-card begins the process of determining which configuration is present as shown by arrow 310. First, the output of buffer 106 is set to +5 Volts, as shown by block 302. Next, as shown by arrow 311, and decision block 303, the voltage at buffer 107 is determined. If the Voltage is determined to be zero Volts, as shown by line 313 and block 306, the PC-card is connected to a PCMCIA compliant host. If the voltage detected is +5 Volts, as shown by arrow 312, the PC-card is not connected to a PCMCIA-compliant host. Since the voltage level would be the same when the PC-card is not connected to any host as when it is connected to the non-PCMCIA-compliant host, further detection work is necessary to identify the stand-alone operational mode. Therefore, if the voltage detected is +5 Volts, the output of buffer 106 is set to 0 Volts as shown by block 304. Then, as shown by arrow 314 and decision block 305, the voltage on buffer 107 is determined. If the voltage detected at buffer 107 is 0 Volts, as shown by arrow 315, and block 307, the PC-card is not connected to a host. If the voltage detected is 5 Volts, as shown by arrow 316 and block 308, the PC-card is connected to a non-PCMCIA host.

Continuing with FIG. 3, if the PC-card is connected to a PCMCIA-compliant host, shown by block 306, as indicated by arrow 318 and block 319, a first set of operations and functions will be performed by the PC-card. These functions include operation as a modem so as to allow for the coupling of data between the PCMCIA compliant host and other devices and systems through phone lines connected to the PC-card. If the PC-card is connected to a non-PC-compliant host, as shown by block 308, as illustrated by arrow 320, a second set of functions will be performed by the PC-card. As shown by block 321, when the non-PCMCIA host is a charger and adapter, the PC card performs a set of designated functions which may include charging the battery of the PC-card and functioning through an adapter so as to perform functions through a RS-232 connector. The functions performed through the RS-232 adapter may be the same or similar to the functions performed when connected to a PCMCIA interface as shown by block 319 or they may be entirely different. When no host is detected, as shown by block 307, the PC-card performs a third set of functions as shown by arrow 322 and block 323, designated as stand-alone functions. These stand alone functions may involve detection and storage of information on incoming calls, recording of caller-id, responding in a certain way to incoming calls or any of a number of other functions.

Figure 4:
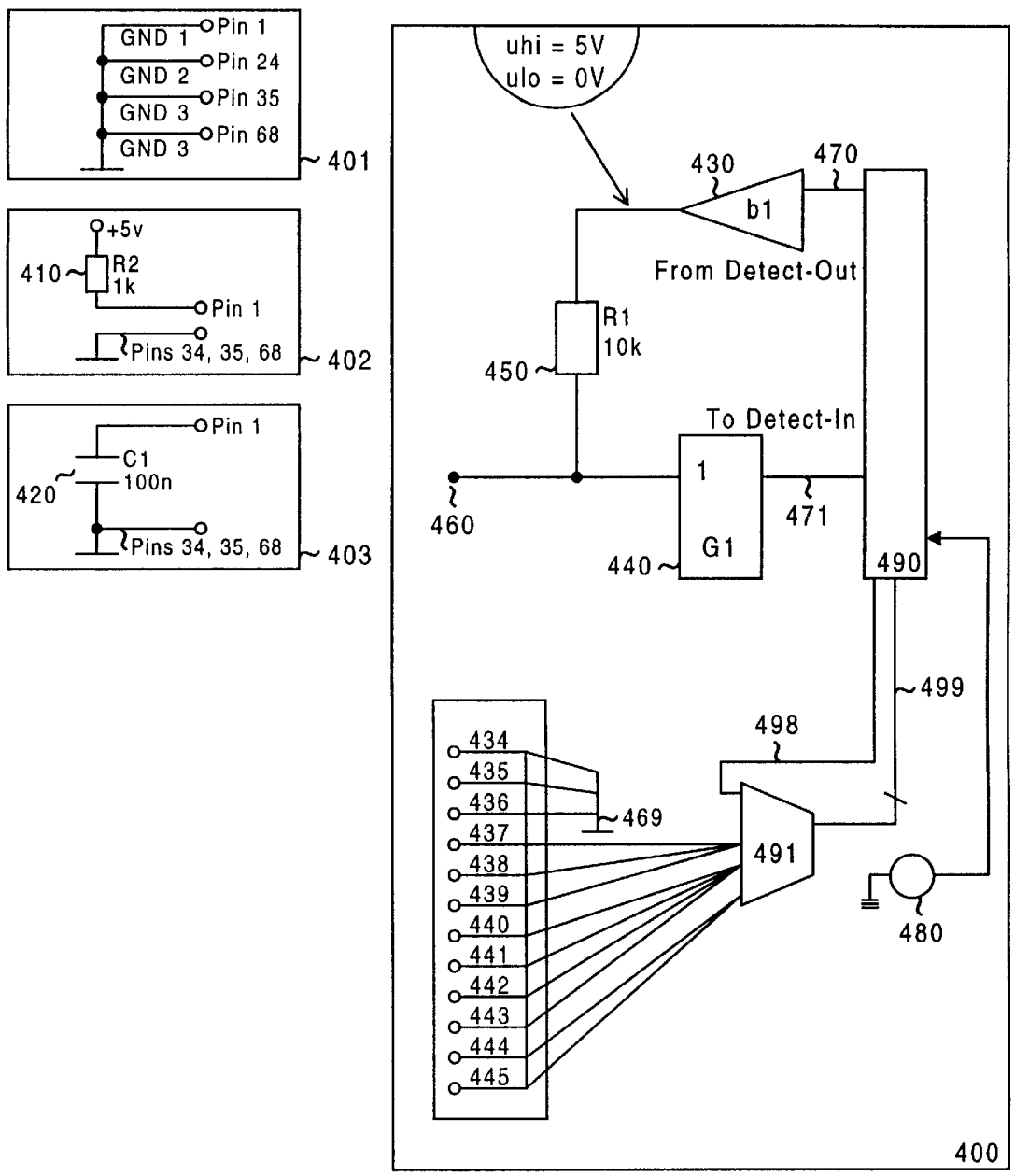
FIG. 4 is a diagram of a PC-card and three different hosts in accordance with a second embodiment of the present invention.

FIG. 4 shows a second embodiment in which PC-card 400 distinguishes between different non-PCMCIA compliant interfaces such as non-PCMCIA compliant interface of host 402 and non-PCMCIA compliant interface of host 403 in addition to distinguishing PCMCIA compliant interfaces such the PCMCIA-compliant interface of host 401, and the condition where there are no connected devices. As required in the PCMCIA standard, the designated ground pins of the PCMCIA compliant interface of host 401, including pin 1, pin 34–35, and pin 68 are connected to ground. The detect-pin is designated as pin 1. As in the first embodiment, it is not relevant which of the four pins serves as detect-pin. Therefore, as in the first embodiment, when the PC-card is connected to a PCMCIA compliant interface such as the PCMCIA-compliant interface of host 401, the connection of pin 1 to ground is detected by the detection circuits of PC-card 400. Non-PCMCIA compliant interface of host 402 includes resistor 410 which is connected to pin 1. As in the first embodiment, when PC-card 400 is connected to the non-PCMCIA compliant interface of host 402, resistor 410 is detected by the detection circuits of PC-card 400 so as to identify host 402. Non-PCMCIA compliant interface of host 403 includes capacitor 420 which is connected to pin 1. Capacitor 420 may be a 100n capacitor. When PC-card 400 is connected to non-PCMCIA compliant interface 403, capacitor 420 is detected by the detection circuits of PC-card 400 so as to indicate a identify host 403. Additional non-PCMCIA-compliant interface may be discerned by using different capacitors in the circuits of the additional hosts.

Continuing with FIG. 4, the detection circuit of PC-card 400 is the same as the detection circuit of the first embodiment except that buffer 440 which detects the voltage at receptacle 460 which receives pin 1, detects the voltage both immediately after power is applied to the circuit and after a predetermined time delay. Microcontroller 490 is connected to buffer 430 and resistor 450 as shown by arrow 470. Receptacle 460 which receives pin 1 is connected to buffer 440 which is connected to microcontroller 490, as shown by arrow 471. Receptacles 434, 435 and 436 serve as power supply pins and are connected to ground of the card's internal power supply as shown by line 469. Receptacles 437–445 connect to multiplexer 491 which is connected to microcontroller 490 as shown by arrow 499. Power source 480 supplies power to the PC-card 400. Microcontroller 490 couples to multiplexer 491 as shown by arrow 498. Multiplexer 491 changes the routing of connections between pins 437–445 so as to conform with the functional assignments of each different interface which is connected to PC-card 400.

Figure 5:
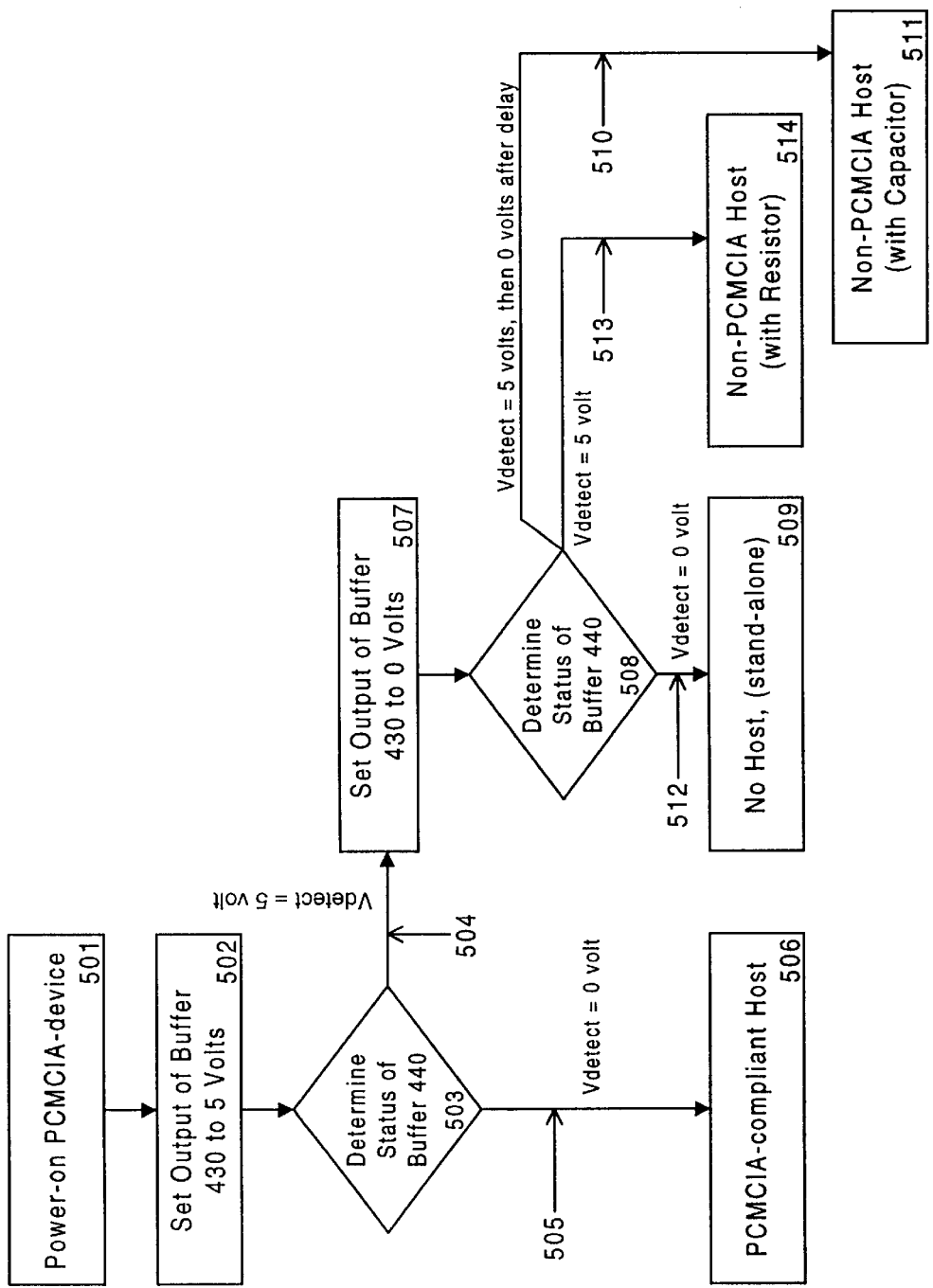
FIG. 5 is a diagram of a decision tree in accordance with a second embodiment of the present invention.

FIG. 5 shows a decision tree which illustrates the method for determining the different operational modes in the second embodiment of the present invention. Once power is applied to the PC-card, as shown by block 501, the PC-card begins the process of determining which operational mode is to be used. First, the output of buffer 430 is set to +5 Volts, as shown by block 502. Next, as shown by decision block 503, the voltage at buffer 440 is determined. If the Voltage is determined to be 0 Volts as shown by arrow 505, the PC-card is connected to a PCMCIA compliant host, shown by block 506. Therefore, the functional assignments of the various connector receptacles (not shown) conform to the functional assignments dictated by the PCMCIA standard. If the voltage detected is +5 volts, as shown by arrow 504, PC-card is not connected to a host having a PCMCIA-compliant interface. In that case, the output of buffer 430 is set to 0 volts as shown by block 507. Then, as shown by decision block 508, the voltage on buffer 440 is determined. If the voltage detected at buffer 440 is 0 volts, as shown by arrow 512, and block 509, the PC-card is not connected to a host. Therefore, functions corresponding to the stand-alone-mode will be performed. If the voltage detected is 5 Volts, as shown by arrow 513 and block 514, the PC-card is connected to a non-PCMCIA compliant host including a resistor such as non-PCMCIA host 402 shown in FIG. 4. The functional assignments of the receptacles of the PC-card are changed to comply with the requirements of the non-PCMCIA compliant host including a resistor and a predetermined set of functions will be performed by the PC-card. After a time delay, if the voltage drops to 0 Volts, as shown by arrow 510 PC-card 400(not shown) is connected to a non PCMCIA-compliant host having a capacitor such as host 403 shown in FIG. 4. The functional assignments of the receptacles of the PC-card will then be changed to comply with the requirements of the non-PCMCIA compliant host including a capacitor and a predetermined set of functions will be performed by the PC-card.

Figure 6:
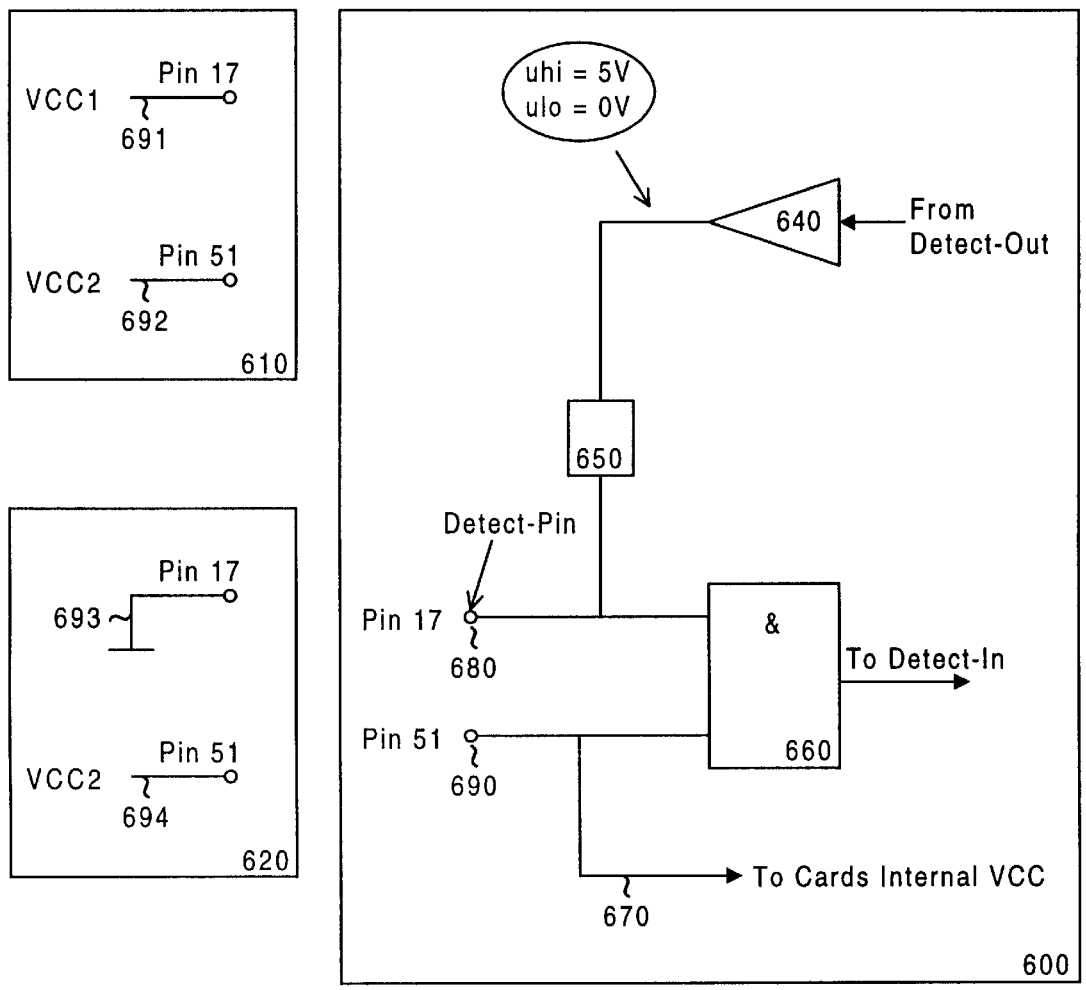
FIG. 6 is a diagram of the detection circuits of a PC-card and two different hosts in accordance with a third embodiment of the present invention.

The electrical PCMCIA-interface contains redundant pins, such as the power supply pins $V_{cc}$. Therefore, it is possible to use at least one of them for signal or detection purposes without reducing the functionality of the actual PCMCIA interface. FIG. 6 illustrates the detection circuits of a third embodiment in which pins VCC1 and VCC2 defined pursuant to the PCMCIA standard are used to determine whether or not PC-card 600 is attached to either a PC-compliant interface such as the PC-compliant interface of host 610 or a non-PC-compliant interface such as host 620 or is not connected to any interface. In this embodiment, pin 17 is shown to be the detect pin. However it does not matter which of pins 17 and 51 are used as the detect-pin. As shown by line 691, pin 17 is connected to VCC1 and as shown by line 692, pin 51 is connected to VCC2. In host 620 which does not have a PCMCIA-compliant interface, pin 17 is connected to ground as shown by line 693 and pin 51 is connected to VCC2 as shown by line 694. PC-card 600 includes buffer 640, buffer 660, receptacle 680, receptacle 690, line 670 and resistor 650.

Figure 7:
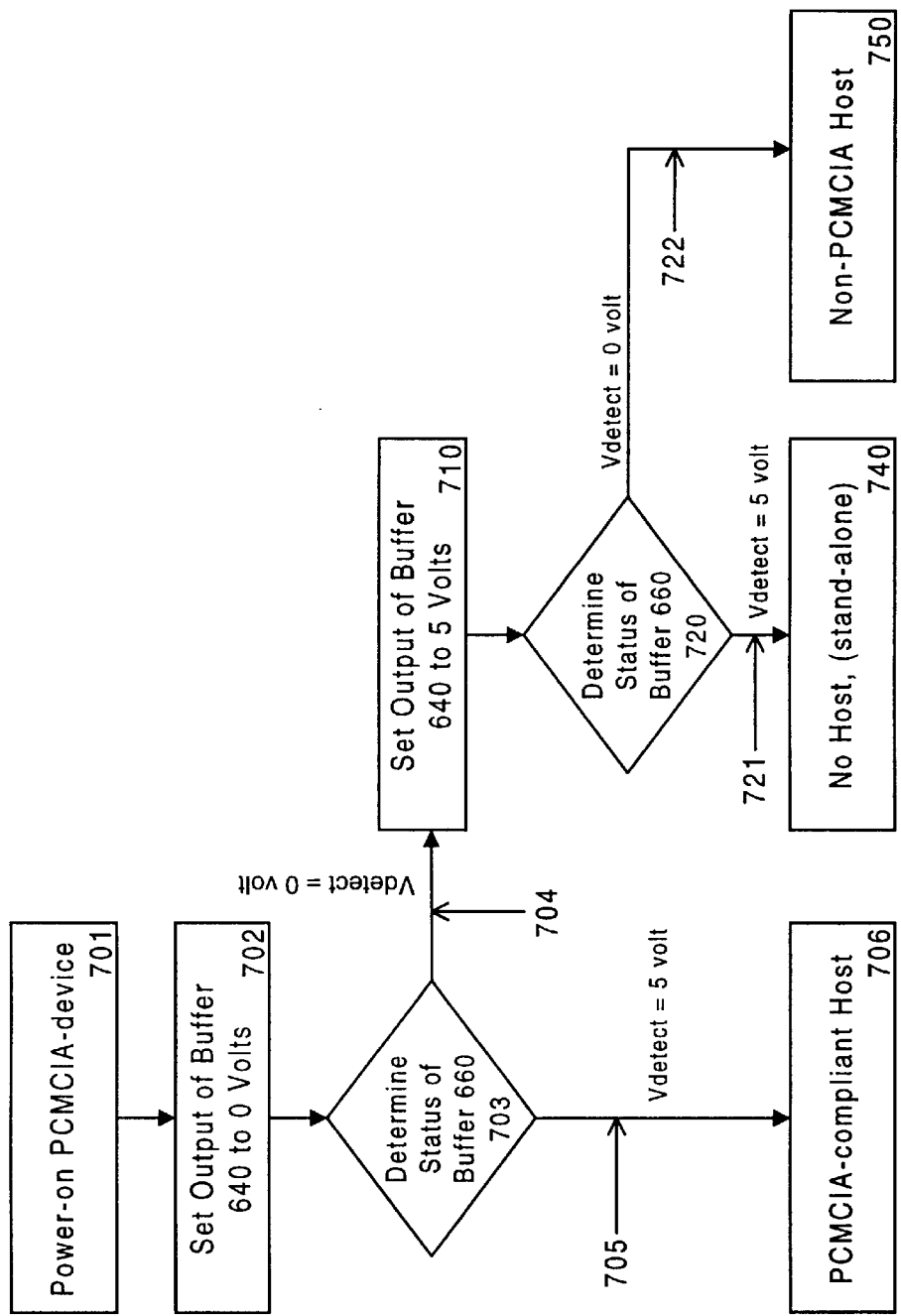
FIG. 7 is a diagram of a decision tree in accordance with a third embodiment of the present invention.

FIG. 7 shows a decision tree which illustrates the method for distinguishing between the different interfaces in the third embodiment of the present invention. Once power is applied to the PC-card, as shown by block 701, the PC-card begins the process of determining which operational mode is to be used. First, the output of buffer 640 is set to 0 Volts, as shown by block 702. Next, as shown by decision block 703, the voltage at buffer 660 is determined. If the Voltage is determined to be 5 Volts as shown by arrow 705, the PC-card is connected to a PCMCIA compliant host, shown by block 706. If the voltage detected is 0 Volts, as shown by arrow 704, the PC-card is not connected to a PCMCIA-compliant host. In that case, the output of buffer 660 is set to 5 Volts as shown by block 710. Then, as shown by decision block 720, the voltage at buffer 660 is determined. If the voltage detected is 5 Volts, as shown by arrow 721, the PC-card is not connected to a host as shown by block 740. If the voltage detected is 0 Volts, as shown by arrow 722, the PC-card is connected to a host having a non-PCMCIA compliant interface, as shown by block 750, such as host 620 shown in FIG. 6.

Figure 8:
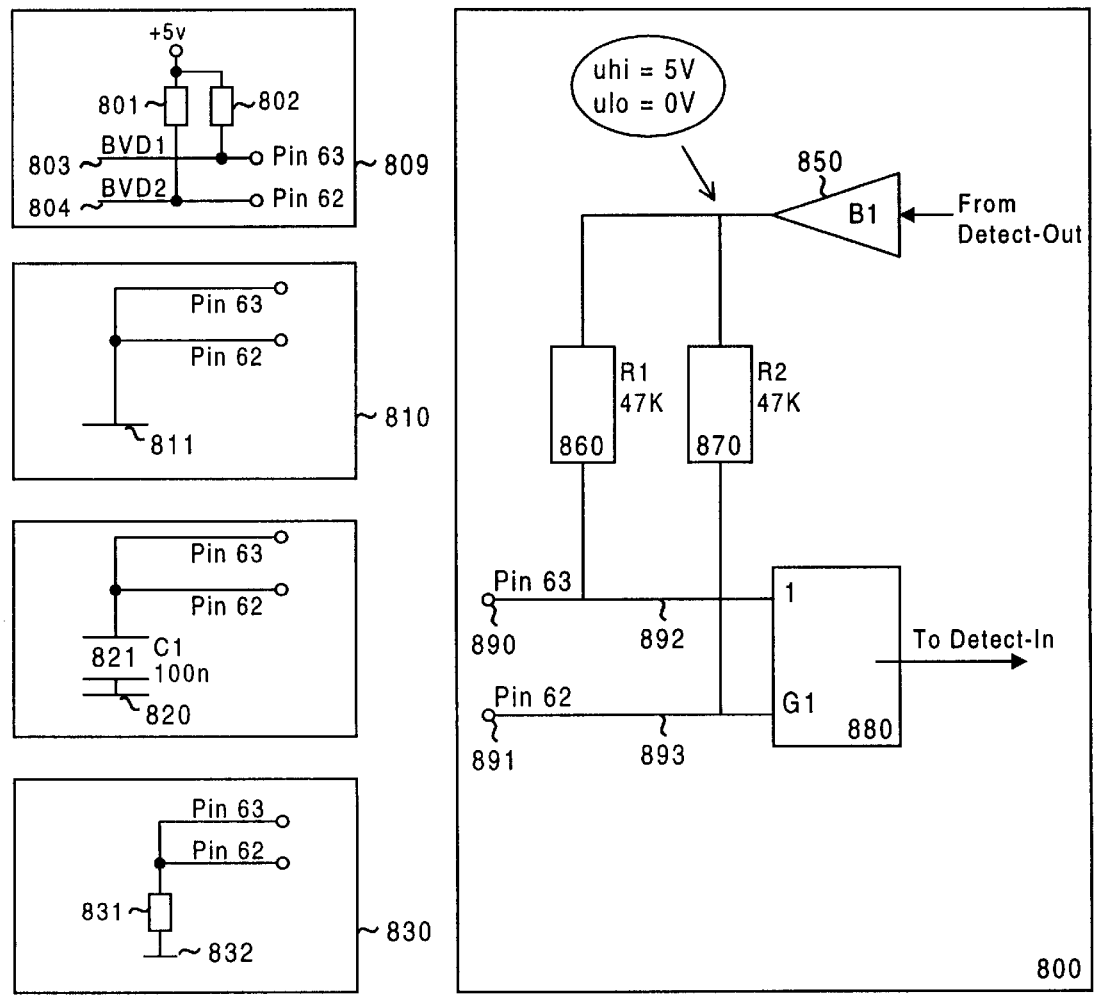
FIG. 8 is a diagram of the detection circuits of a PC-card and four different hosts in accordance with a fourth embodiment of the present invention.

FIG. 8 shows a fourth embodiment in which interface detection is accomplished through the BVD1 and BVD2 connections. The PCMCIA interface uses the BVD1 and BVD2 connections in order to inform the PCMCIA-compatible host about certain conditions on the PC-card. During the start up phase of the PCMCIA interface, the PC-card is able to detect if the card is connected to a PCMCIA compatible host, respectively if those connections are not used for PCMCIA-specific purposes. This possibility does not reduce the functionality of the PCMCIA interface. With respect to host 809 which has a PCMCIA-compliant interface, as per the PCMCIA standard, and as shown by line 803, BVD1 signals are transmitted and received over pin 63. As shown by line 804, BVD2 signals are transmitted and received over pin 62. As required by the PCMCIA standard, a Voltage of +5 Volts is applied to resistor 801 which is connected to BVD2 line 804 and is applied to resistor 802 which is connected to BVD1 line 803. Host 810 which has a non-PCMCIA compliant interface connects pin 62 and pin 63 to ground as shown by line 811. Host 820 which includes a second non-PCMCIA compliant interface includes capacitor 821 which is a 100$n$ capacitor which is connected at one end to pins 62–63 and which is connected to ground, as shown by line 820 at its other end. Host 830 also has a non-PCMCIA compliant interface which includes resistor 831. Resistor 831 is connected to ground at one end, as shown by line 832 and is connected to pin 63 and pin 62.

The detection circuits of PC-card 800 includes buffer 850 which is connected to resistor 860 and resistor 870 which are 47k ohm resistors. Resistor 860 is connected to receptacle 890 which receives pin 63 and is connected to buffer 880 as shown by line 892. Resistor 870 connects to receptacle 891 which receives pin 62 and is also connected to buffer 880 as shown by line 893. Buffer 880 detects the signals coming from both line 892 and line 893 so as to distinguish between different interfaces of host 809, host 810, host 820, host 830 and no-host(stand alone mode). Buffer 850 and buffer 880 may be stand-alone components, or they may be integrated into microcontroller 840 as input and output buffers.

With reference again to FIG. 8, additional hosts with non-PCMCIA compliant interfaces may be added by including the same circuit as shown in host 820 in each of the added hosts and replacing capacitor 821 with capacitors having varying capacitance. Alternatively, additional hosts with non-PCMCIA compliant interfaces may be added by including the same circuit as shown in host 830 in each of the added hosts and replacing resistor 831 with a resistor having a different resistance. By replacing buffer 880 with an analog to digital converter, the different values of resistance could be detected.

In operation, once power is applied to the PC-card 800 the process of determining which operational mode is to be used is initiated. First, the output of buffer 850 is set to +5 Volts. Next, the voltage at lines 892 and 893 are determined. If the Voltage is determined to be 0 Volts(LOW), the PC-card is connected to a non PCMCIA compliant host such as host 810. If the voltage detected is +5 Volts(HIGH), the output of buffer 850 is set to 0 Volts. Then the voltage on lines 892–893 are again determined. If the voltage detected is 5 Volts(logical HIGH) the PC-card is connected to a host through a PCMCIA-compliant interface such as host 809. If the voltage detected is 5 Volts(HIGH) followed by 0 volts (LOW) after a delay, PC-card 800 is connected to a host having a non-PCMCIA-compliant interface which including a capacitor such as host 820. If the voltage detected is greater than 0 volts (between LOW and HIGH), PC-card 800 is connected to a host having a non-PCMCIA-compliant interface which includes a resistor such as host 830. An analog to digital converter is required (not shown) since the voltage level to be detected is neither a HIGH or a LOW. If the voltage detected is 0 volts, PC-card 800 is not connected to any host.

Figure 9:
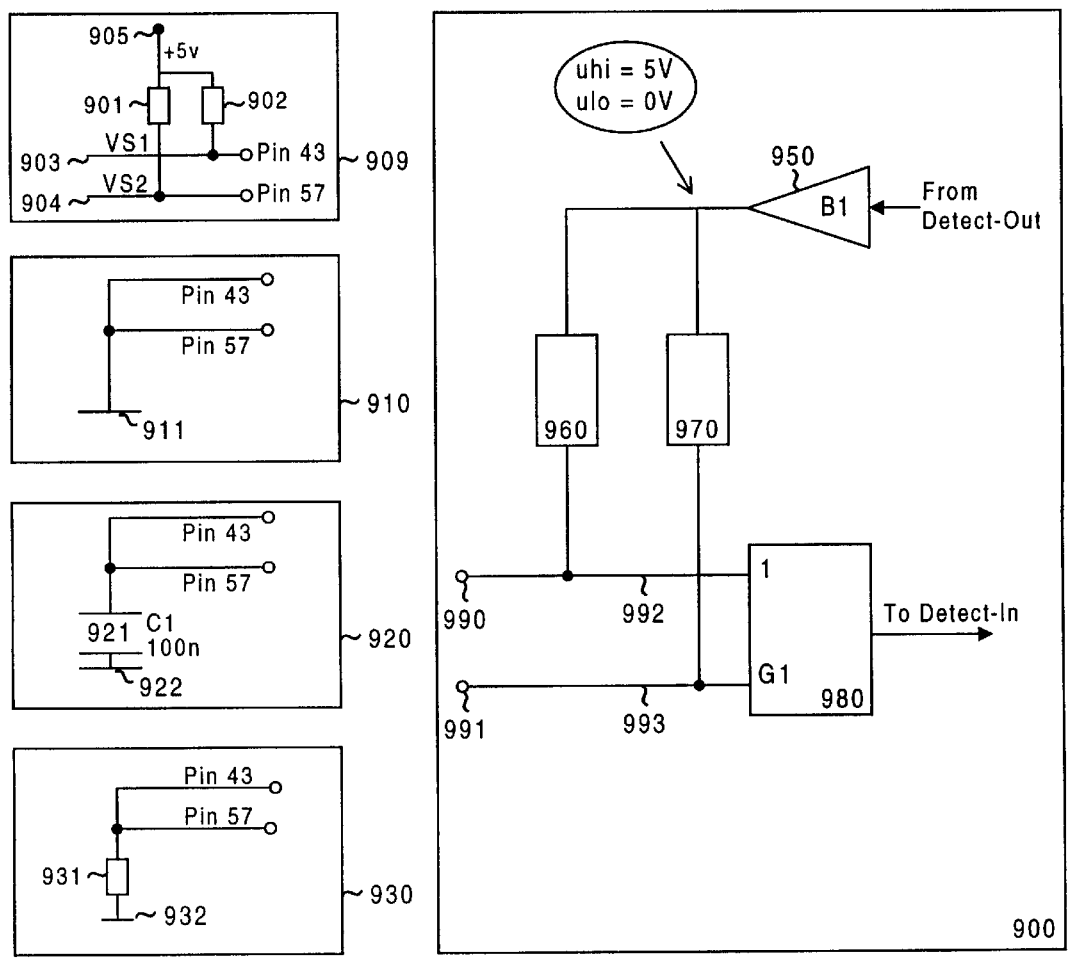
FIG. 9 is a diagram of the detection circuits of a PC-card and four different hosts in accordance with a fifth embodiment of the present invention.

FIG. 9 shows a fifth embodiment in which interface detection is accomplished through the VS1 pin and the VS2 pin. The PCMCIA interface uses the connections VS1 and VS2 to inform the PCMCIA-compatible host about certain conditions on the PCMCIA-card. Host 909 which has a PCMCIA compliant interface receives VS1 signals over pin 43, as shown by line 903. As per the PCMCIA standard, and as shown by line 904, VS2 signals are received over pin 57. As required by the PCMCIA standard, a Voltage of +5 Volts, shown by circle 905, is applied to resistor 901 which is connected to VS2 line 904 and is applied to resistor 902 which is connected to VS1 line 903. Host 910 which has a non-PCMCIA compliant interface connects pin 43 and pin 57 to ground as shown by line 911. Host 920 which has a non-PCMCIA compliant interface includes capacitor 921 which is a 100n capacitor which is connected at one end to pin 43 and pin 57 and which is connected to ground, as shown by line 922 at its other end. Host 930 is also has a non-PCMCIA compliant interface. Host 930 includes resistor 931. Resistor 931 is connected to ground at one end, as shown by line 932 and is connected to pin 43 and pin 57.

The detection circuits of PC-card 900 include buffer 950 which is connected to resistor 960 and resistor 970 which are 47k ohm resistors. Resistor 960 is connected to receptacle 990 which receives pin 43 and is connected to buffer 980 as shown by line 992. Resistor 970 connects to receptacle 991 which receives pin 57 and is also connected to buffer 980 as shown by line 993. Buffer 980 detects the signals coming from both line 992 and line 993. The detection circuit detects the electrical circuits to which receptacle 990 and receptacle 991 are connected so as to distinguish between different interfaces of host 909, host 910, host 920, host 930 and no-host(stand alone mode).

With reference again to FIG. 9, additional hosts with non-PCMCIA compliant interfaces may be added by including within each new host, the same circuit as shown in host 920 and by replacing capacitor 921 in each new host with a capacitor having a different capacitance. By using the delay caused by the varying capacitance, the different values of capacitance can be detected by buffer 980. Alternatively, additional hosts with non-PCMCIA compliant interfaces may be added by including the same circuit as shown in host 930 in each of the added hosts and replacing resistor 931 in each new host with a resistor having a different resistance. By replacing buffer 980 with an analog to digital converter, the different values of resistance could be detected.

Figure 10:
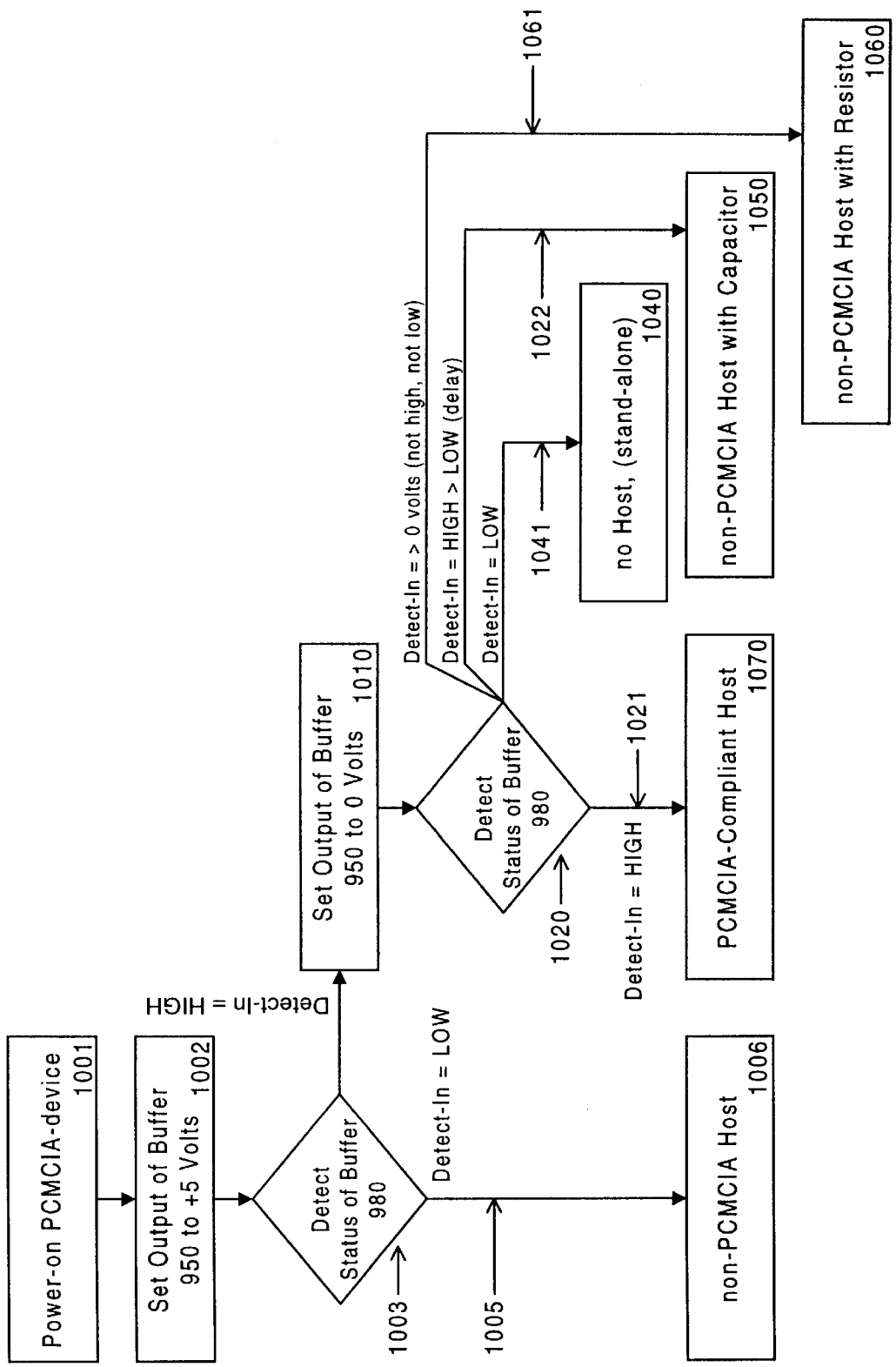
FIG. 10 is a diagram of a decision tree in accordance with a fifth embodiment of the present invention.

FIG. 10 shows a decision tree which illustrates the method for distinguishing between the different interfaces in the fifth embodiment of the present invention. Once power is applied to the PC-card, as shown by block 1001, the PC-card begins the process of determining which operational mode is to be used. First, the output of buffer 950 is set to +5 Volts, as shown by block 1002. Next, as shown by decision block 1003, the status of buffer 980 is determined. If the Voltage is determined to be 0 Volts(LOW) as shown by arrow 1005, the PC-card is connected to a non PCMCIA compliant host, shown by block 1006 such as host 910 (shown in FIG. 9). If the voltage detected is +5 Volts(HIGH), as shown by arrow 1004, the output of buffer 950 is set to 0 volts as shown by block 1010. Then, as shown by decision block 1020, the status at buffer 980 is determined. If the voltage detected is 5 volts, as shown by arrow 1021, and block 1070, the PC-card is connected to a PCMCIA-compliant host such as host 909 (shown in FIG. 9). If the voltage detected is 5 Volts(HIGH) followed by 0 volts(LOW) after a delay as shown by arrow 1022, and block 1050, the PC-card is connected to a non-PCMCIA-compliant host including a capacitor such as host 920 (shown in FIG. 9). If the voltage detected is 0 volts (Low), as shown by arrow 1041, the PC-card is not connected to a host, shown by block 1040. If the voltage detected is greater than 0 volts but is not 5 volts(neither HIGH or LOW as measured by an analog to digital converter(not shown)), as shown by arrow 1061 and block 1060, the PC-card is connected to a non-PCMCIA-compliant host including a resistor such as host 930 (shown in FIG. 9).

Though the first five embodiment are described as using a multiplexer, alternatively, a bus with three state output could be used. In addition, though voltages are referenced as being specific voltages such as 5 volts (HIGH) or 0 volts (LOW), the voltage levels do not have to be exactly 5 volts or 0 volts since the voltages are determined within a predetermined range. Thus, for example, if a range of 2.5 volts to 5 volts is used as high, a voltage of 3 volts would constitute a logical HIGH. Furthermore, though the present invention is described with reference to 5 volt logic, 3.3 volt logic could also be used or any other voltage that complies with PCMCIA standards. If a different volt logic, such as 3.3 volt logic is used, ranges for HIGH and LOW would be changed accordingly.

The apparatus and method disclosed in the present invention overcomes connectivity limitations on PCMCIA compatible devices by detecting the different interfaces and reconfiguring standard PCMCIA receptacles so as to conform with the connectivity requirements of various different electrical interfaces. This eliminates the need for extra pins other than the standard PCMCLA/PC-CARD95 pins and extra connectors. In addition, since the device to which the PC-card is connected may be identified, specific sets of functions may be performed for each different connection status. Thus, more versatile products with enhanced connectivity may be designed which use the PCMCIA and PC-CARD95 standards.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An electrical device that is connectable to one of a plurality of hosts having different interfaces comprising:
   a housing;
   a functional circuit disposed within said housing and adapted to perform a designated function;
   a connector disposed within said housing and having a plurality of receptacles to receive pins from a host interface;
   a detection circuit disposed within said housing and connected to a designated receptacle for determining a state of a corresponding pin of said host interface wherein said state indicates whether said host interface is PCMCIA compliant or is not PCMCIA compliant; and
   a multiplexer disposed within said housing and coupled to said detection circuit which electrically couples said receptacles to said functional circuit according to functional assignments complying with the PCMCIA standard if it is determined that the host interface is PCMCIA compliant, otherwise said multiplexer couples said receptacles to said functional circuit according to functional assignments to properly interface with a non-PCMCIA-compliant interface.

2. The electrical device of claim 1 wherein said electrical device is a PC-card.

3. The electrical device of claim 2 wherein said detection circuit identifies hosts having non-PCMCIA-compliant interfaces which include a detection pin coupled to a resistor.

4. The electrical device of claim 2 wherein said detection circuit identifies hosts having non-PCMCIA-compliant interfaces which include a detection pin coupled to a capacitor.

5. The electrical device of claim 2 wherein said detection circuit identifies hosts having non-PCMCIA-compliant interfaces which include a detection pin that is connected to ground.

6. The electrical device of claim 2 wherein said detection circuit identifies hosts having non-PCMCIA-compliant interfaces which include a detection pin connected to a voltage source.

7. The electrical device of claim 2 wherein said PC-card performs a first set of functions which includes the function of operating as a modem when connected to a host having a PCMCIA-compliant interface and wherein said PC-card performs a second set of functions that includes the function of operating as a modem upon connection to a host having a non-PCMCIA-compliant interface.

8. The electrical device of claim 7 wherein said electrical device includes a battery and wherein said second set of functions includes the function of charging said battery.

9. The electrical device of claim 8 wherein said detection circuit determines that said electrical device is not connected to any interface, and wherein, upon the determination that said electrical device is not connected to any interface, said electrical device performs a third set of functions.

10. The electrical device of claim 9 wherein said internal circuits include a microprocessor and wherein said detection circuit includes a first buffer and a second buffer and a resistor, said first buffer connected to said resistor and said detection receptacle connected to said resistor and said second buffer such that electrical current may flow form said first buffer, through said resistor and to said second buffer.

11. A PC-card comprising:

a housing;

a power source disposed within said housing;

a microcontroller disposed within said housing and coupled to said power source;

a plurality of receptacles including a detection receptacle, said receptacles disposed within said housing such that they may receive pins from a host, said receptacles electrically coupled to said microcontroller;

a detection circuit disposed within said housing and connected to a designated receptacle for determining a state of a corresponding pin of said host interface wherein said state indicates whether said host interface is PCMCIA compliant or is not PCMCIA compliant; and a multiplexer disposed within said housing and coupled to said detection circuit which electrically couples said receptacles to internal circuits within said electrical device according to functional assignments complying with the PCMCIA standard if it is determined that the host interface is PCMCIA compliant, otherwise said multiplexer couples said receptacles to said internal circuits according to functional assignments to properly interface with a non-PCMCIA-compliant interface.

12. The PC-card of claim 11 wherein said detection circuit detects hosts having non-PCMCIA-compliant interfaces which include a detection pin coupled to a resistor.

13. The PC-card of claim 12 wherein said detection circuit detects hosts having non-PCMCIA-compliant interfaces that include a detection pin coupled to a capacitor.

14. The PC-card of claim 13 wherein said detection circuit detects hosts having non-PCMCIA-compliant interfaces that include a detection pin that is connected to ground.

15. The PC-card of claim 11 wherein said detection circuit detects when said PC-card is connected to any host and wherein, upon the determination that said PC-card is not connected to any host a set of stand-alone functions are performed.

16. For a PC card adapted to couple to both a host that includes an interface that complies with the PCMCIA standard and a host that includes a non-PCMCIA-compliant interface, said PC card having a receptacle coupled to a detection circuit including a first buffer, a second buffer and a resistor, wherein said first buffer is coupled to said resistor and said resistor is coupled to said receptacle and said resistor is coupled to said second buffer, a method for determining whether said PC card is coupled to a PCMCIA-compliant interface comprising:

applying an electrical current to said first buffer;

determining a voltage at said second buffer wherein zero volts indicates that said PC card is coupled to a host having a PCMCIA-compliant interface;

setting the output of the first buffer to zero volts if the voltage at said second buffer is equal to the voltage applied to said first buffer; and determining the voltage at said second buffer when the output of the first buffer is zero volts wherein zero volts indicates that said PC card is not connected to any host and a voltage greater than zero volts indicates that said PC card is connected to a host which is does not have a PCMCIA compliant interface.

17. The method of claim 16 wherein said PC card has an interface that complies with the standards of the PCMCIA standards body.

18. The method of claim 17 wherein said PC-card also detects a host having a non-PCMCIA compliant interface which includes a detection pin and a capacitor coupled to said detection pin.

19. The method of claim 17 wherein said PC-card also detects a host having a non-PCMCIA compliant interface which includes a detection pin and a resistor coupled to said detection pin.

* * * * *